United States Patent [19]

Cirello

[11] Patent Number: 5,190,784
[45] Date of Patent: Mar. 2, 1993

[54] METHOD FOR MAKING SALMON AND CRAWFISH FLAVORING COMPOSITIONS

[76] Inventor: Alfredo Cirello, Via Arona, 16, 20145 - Milano, Italy

[21] Appl. No.: 805,527

[22] Filed: Dec. 11, 1991

[51] Int. Cl.$^5$ .............................................. A23L 1/325
[52] U.S. Cl. .................................. 426/533; 426/643; 426/650
[58] Field of Search ............... 426/533, 643, 650, 657, 426/495

[56] References Cited

U.S. PATENT DOCUMENTS

| | | | |
|---|---|---|---|
| 2,813,027 | 11/1957 | Galliver et al. | 426/643 X |
| 3,264,116 | 8/1966 | Gray | 426/643 X |
| 3,836,686 | 9/1974 | Roels | 426/657 |
| 4,794,007 | 12/1988 | Ozaki | 426/495 X |

FOREIGN PATENT DOCUMENTS

| | | | |
|---|---|---|---|
| 59-232064 | 12/1984 | Japan | 426/650 |
| 63-17673 | 1/1988 | Japan | 426/650 |

*Primary Examiner*—Arthur L. Corbin
*Attorney, Agent, or Firm*—Bucknam and Archer

[57] ABSTRACT

A method of making a food composition having a remarkable and long duration salmon or crawfish flavor involves the steps of: providing a low value dry ground fish meat as a precursor meat material; reacting the dry ground fish meat with 37% HCl for 24 hours at a temperature of 100°–103° C. to provide a reaction mixture, while refluxing reaction vapors from the mixture; neutralizing the mixture with sodium carbonate having a pH of 6–7; filtering the mixture to provide a clear liquid; concentrating the clear liquid under a reduced pressure at 40° C. to 26–30 Bé; and filtering the clear liquid to remove undesired salts.

8 Claims, No Drawings

METHOD FOR MAKING SALMON AND CRAWFISH FLAVORING COMPOSITIONS

BACKGROUND OF THE INVENTION

As is known, salmon and crawfish are considered in the food market particularly valuable sea products, owing to their meat delicacy and, in particular, owing to their unmistakable flavour which is highly appreciated in gastronomy.

The preservation of these products, however, is affected by serious problems due to the quickly perishable nature of their meat.

Prior methods which have been found partially valid are the so-called deep-freezing of the fresh meat or a partial cooking of salmon or crawfish, or their preservation by canning and pasteurizing or sterilizing steps.

However, the above mentioned prior preserving methods greatly reduce the characteristic flavour of this valuable meat which looses a substantial portion of its gastronomic value.

Attempts to provide flavoured salmon or crawfish compositions have not been found to provide satisfactory results.

For example, it is possible, by using suitable analysis methods, to detect the main chemical components of the flavour of fresh salmon and crawfish, but a synthetic flavour prepared by mixing the individual chemical components determined by synthetic methods has not been found satisfactory since, probably, this synthetic flavour does not include also those traces of other unidentifiable chemical components which, on the other hand, form an integrating part of the flavour "bouquet"; moreover, prior synthetic methods for providing salmon and crawfish flavour provided a very expensive product the cost of which is much greater than the cost of fresh salmon and crawfish.

SUMMARY OF THE INVENTION

Accordingly, the main object of the present invention is to provide a method for chemically semisynthetically preparing a composition which has remarkable flavouring properties making said composition suitable as a substitute of salmon and crawfish flavour.

Another object of the present invention is to provide such a composition which is stable in the time and, moreover, has good organoleptic properties making said composition very suitable for a gastronomy use.

Another object of the present invention is to provide a method which is very simple to be carried out and allows to obtain a reduced cost flavoured composition.

Yet another object of the present invention is to provide such a method which, as natural precursors, uses preferably low cost pollack and cod-fish meat.

Yet another object of the present invention is to provide such a method in which the mentioned pollack and cod-fish dried meat can be used per se or mixed with other types of fish meat of low commercial value.

In the method according to the invention, the proportion or ratio of the two raw starting materials, that is dry pollack meat and dry cod-fish meat, can be changed at will depending on the intensity or strength of the flavour to be obtained.

The addition of dried fish meat of any other type, and of low commercial value, may be useful as more delicate salmon or crawfish flavours are to be obtained.

Substantially, the method herein claimed comprises the step of reacting the dry fish meat with 37% hydrochloric acid at a temperature from 90° to 110° C. and preferably from 100° to 103° C., and for a reaction time from 6 to 30 hours and preferably from 18 to 24 hours.

Upon neutralizing the acid mixture, for example by sodium carbonate, the obtained mixture is accurately filtered and the clear solution is concentrated under vacuum at a low temperature, to about 30 Bé.

Then, the salts are accurately filtered out, and the obtained clear liquid can be used as obtained, or it can be concentrated to the required density and for the intended uses, for example it can be concentrated to a paste-like density.

The following example are exclusively provided for illustrating the invention without limiting it.

DESCRIPTION OF THE PREFERRED EMBODIMENTS

Example 1

Making Method

In a glass flask provided with stirrer, thermometer and reflux cooling, there are mixed 100 g of dry pollack ground meat and 300 g of dry cod-fish ground meat, with 440 ml of 37% hydrochloric acid. The mixture is reacted for 24 hours at 100°–103° C., by refluxing the formed vapors. The mixture is neutralized by sodium carbonate having a pH of 6–7.

Then, the mixture is accurately filtered and the obtained clear liquid is concentrated under a reduced pressure and at 40° C., to 26–30 Bé. The salts are accurately filtered out, and the obtained clear liquid is used in its as made condition, or being concentrated to a variable density depending on the required use.

The obtained concentrated products are characterized by a remarkable and high duration salmon flavour.

EXAMPLE 2

The method of the above Example 1 is followed, by using 150 g of dry pollack meat with 50 g of dry cod-fish meat.

There are obtained compositions characterized by a remarkable and long duration crawfish flavour.

EXAMPLE 3

The method of the previous Examples is followed, by replacing 50% of the dry pollack meat or 50% of the dry cod-fish meat by dry fish meats of different species and low commercial value such as cuttle-fish, sardines, mackerels and the like.

There are obtained compositions in which the salmon flavour or crawfish flavour are very delicate.

EXAMPLE 4

By adding 10% of the composition of Example 1, in a not concentrated condition, to a canned salmon meat, it is obtained that the salmon meat, even after sterilization, releases a remarkable and pleasant salmon flavour.

EXAMPLE 5

By sprinkling on pre-boiled crawfish the composition of the Example 2 in a rate of about 5%, there is obtained that the crawfish meat, upon deep-freezing, releases a pleasant fresh crawfish flavour persisting up to the use time.

EXAMPLE 6

The composition of Example 1 is concentrated under vacuum at 40° C., so as to provide a semi-solid paste (dry residue 80%).

The weight yield is of 400 g.

10 g of this paste are blended with 90 g of fresh cheese (such as crescenza, crescenza, certosa, and so on).

There is obtained a gastronomy composition based on cheese which has a pleasant salmon flavour.

By replacing the cheese with 90 g of butter, there is obtained a particularly tasty gastronomy composition having a remarkable salmon flavour which can be used in its as prepared condition or as a seasoning substance.

I claim:

1. A method for making a food composition having a remarkable and long duration salmon or crawfish flavour, comprising the steps of:
    a) providing a low value dry groud fish meat as a precursor meat material;
    b) reacting said dry ground fish meat with 37% HCl for 24 hours at a temperature of 100°-103° C. to provide a reaction mixture, while refluxing reaction vapors from said mixture;
    c) neutralizing said mixture by contacting with sodium carbonate having a pH of 6-7;
    d) filtering said mixture to provide a clear liquid;
    e) concentrating said clear liquid under a reduced pressure at 40° C. to 26-30 Bé; and
    f) filtering said clear liquid to remove undesired salts therefrom thereby obtaining said food composition.

2. A method according to claim 1, wherein said dry fish meat comprises dry pollack meat and dry cod-fish meat in a ratio of substantially 1:3 by weight.

3. A method according to claim 1, wherein said dry fish meat comprises dry pollack meat and dry cod-fish meat in a ratio of substantially 3:1 by weight.

4. A method according to claim 1, wherein said dry fish meat further comprises cuttle-fish meat.

5. A method according to claim 1, wherein said dry fish meat further comprises sardine meat.

6. A method according to claim 1, wherein said dry fish meat further comprises mackerel meat.

7. A method according to claim 1, wherein said method further comprises the step of concentrating under vacuum at 40° C. said clear liquid to provide a semi-solid paste product having a dry residue of 80%.

8. A method according to claim 7, wherein said method further comprises the step of blending said semi-solid paste product with a fresh cheese in a ratio of substantially 1:9 by weight.

* * * * *